April 9, 1968   F. J. PAPA, JR   3,376,757
VARIABLE TIME CYCLE DEVICE FOR TIMER
Filed Aug. 4, 1966   2 Sheets-Sheet 1
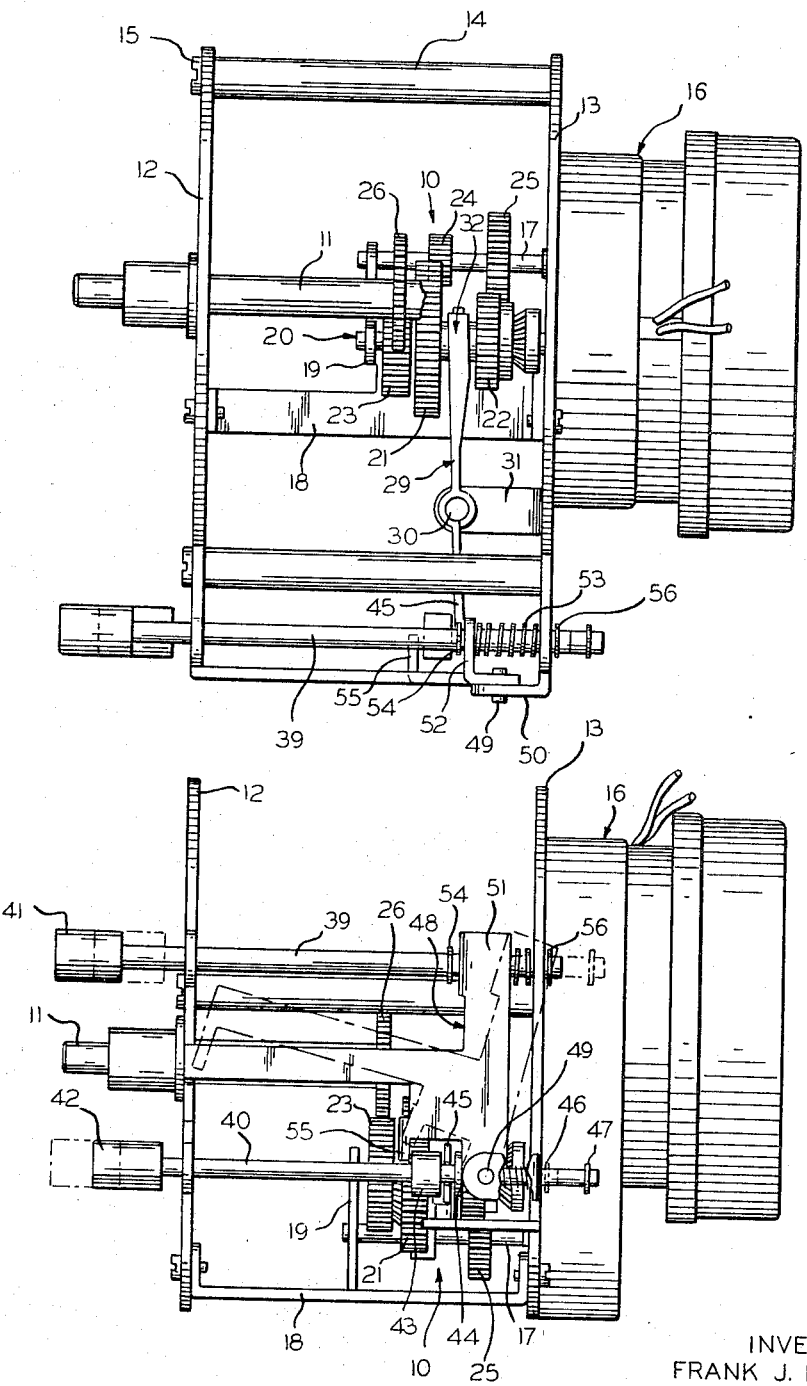
INVENTOR
FRANK J. PAPA, JR
BY Norman A. Witt
ATTORNEY April 9, 1968     F. J. PAPA, JR     3,376,757
VARIABLE TIME CYCLE DEVICE FOR TIMER
Filed Aug. 4, 1966     2 Sheets-Sheet 2
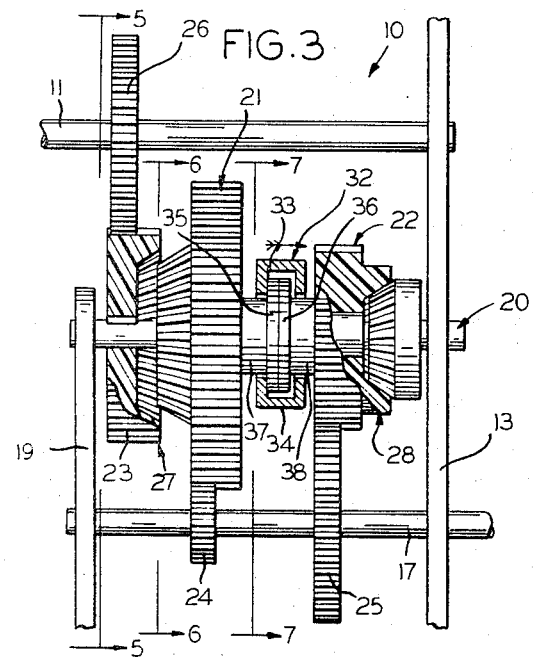
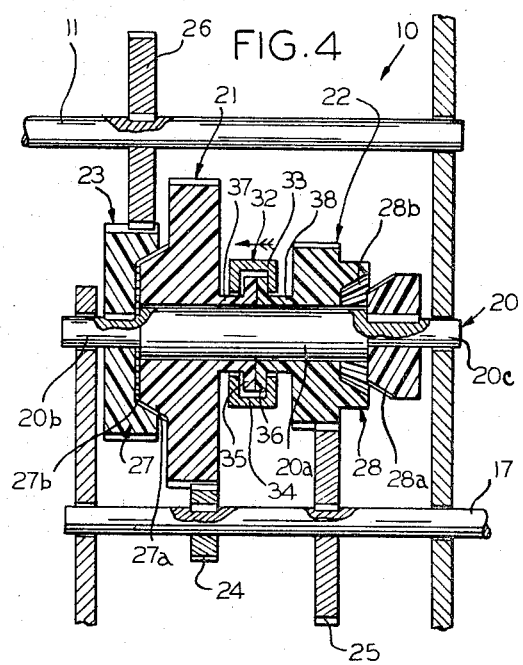
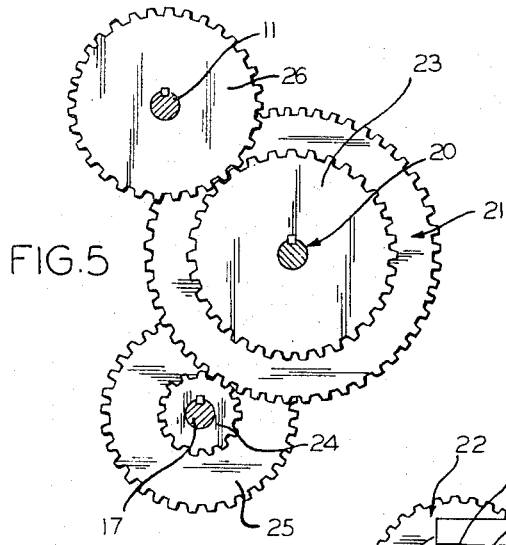
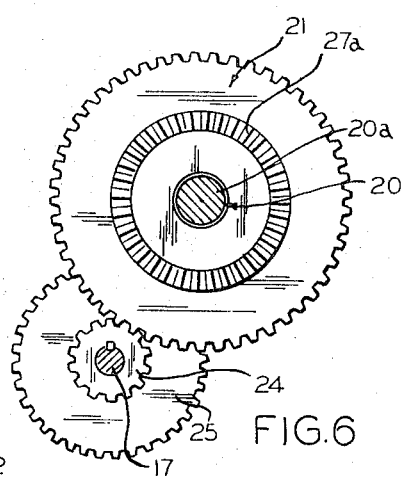
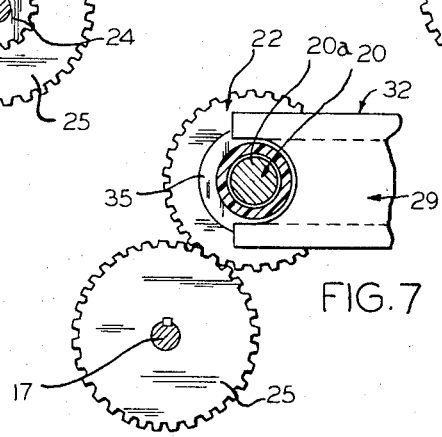
INVENTOR
FRANK J. PAPA, JR
BY Norman A. Witt
ATTORNEY

United States Patent Office 3,376,757
Patented Apr. 9, 1968

3,376,757
VARIABLE TIME CYCLE DEVICE FOR TIMER
Frank J. Papa, Jr., Montville, N.J., assignor to Industrial Timer Corporation, Parsippany, N.J., a corporation of Delaware
Filed Aug. 4, 1966, Ser. No. 570,278
6 Claims. (Cl. 74—370)

ABSTRACT OF THE DISCLOSURE

Variable time cycle device for a timer including a gearing arrangement between the output shaft and a constant speed input shaft having an idler shaft with first and second input gears idly supported thereon and an output gear fixed thereto, a gear on the output shaft meshing with the output gear, first and second gears on the input shaft meshing with the first and second gears on the idler shaft, a clutch between the first input gear and the output gear on the idler shaft where clutch elements are integral with the first input gear and the output gear and a clutch between the second input gear and the idler shaft.

---

This invention relates in general to a timer, and more particularly to a variable time cycle device for a timer, and still more particularly to a timer that may be easily and quickly converted for handling a variable time cycle, and still more particularly to a variable speed gear arrangement for a timer for generating a plurality of time cycles, although other uses and purposes may be apparent to one skilled in the art.

The variable time cycle device of the present invention is especially useful in timing devices where it is desired to generate or define precise periods of time for actuation of mechanisms, and particularly where operation of electrical circuitry in accordance with timed intervals is desired.

The device of the present invention includes a variable speed gear means arranged between the output shaft of the timer and a constant speed input shaft, and includes an idler shaft having first and second input gears idly supported thereon and an output gear fixed thereto, a gear on the output shaft meshing with the output gear, first and second gears on the input shaft respectively meshing with the first and second input gears on the idler shaft, a clutch between the first input gear and the output gear, a clutch between the second input gear and the idler shaft, and means for controlling operation of the clutches. The controlling means be very simply and easily operated through push buttons to selectively lock one of the clutches in engagement while the other clutch is disengaged or locking the other clutch in engagement while the first clutch is disengaged.

Accordingly, it is an object of the present invention to provide a timer having a variable time cycle device for generating different time cycles.

Another object of the present invention is in the provision of the variable time cycle device for a timer that may be quickly and easily operated to shift from one time cycle to another time cycle.

A still further object of the invention is to provide a variable time cycle device for a timer that is simply and economically constructed and compact to facilitate use with heretofore known times.

Other objects, features and advantages of the invention will be apparent from the following detailed disclosure, taken in conjunction with the accompanying sheets of drawings, wherein like reference numerals refer to like parts, in which:

FIG. 1 is a top plan view of a timer embodying the variable time cycle device of the present invention;

FIG. 2 is a side elevational view of the timer of FIG. 1 showing parts in both dotted and full lines to illustrate operation, FIG. 3 is a greatly enlarged view of the variable speed gear arrangement according to the present invention and showing the parts positioned to effect one time cycle, and with some parts broken away and shown in section for purposes of clarity;

FIG. 4 is a view similar to FIG. 3, but showing the movable parts shifted to effect a different time cycle;

FIG. 5 is a sectional view, taken substantially along line 5—5 of FIG. 3;

FIG. 6 is a sectional view taken substantially along line 6—6 of FIG. 3; and

FIG. 7 is a sectional view taken substantially along line 7—7 of FIG. 3.

Referring now to the drawings, and particularly to FIGS. 1 and 2, a timer is illustrated which embodies the variable time cycle device of the present invention with some parts omitted for purposes of clarity. The variable time cycle device of the present invention is generally designated by the numeral 10, and which is provided to generate different time cycles by rotation of an output shaft 11. Although not shown, the output shaft 11 would normally be associated with a switching clutch that would operate one or more switches at timed intervals, the interval depending upon the speed of rotation of the output shaft 11. The output shaft 11 is bearingly supported at opposite ends by front and back mounting plates 12 and 13 that are held in spaced apart, parallel relationship by spacers 14 and fasteners 15. The mounting plates, spacers and fasteners essentially define a frame for the time device. A synchronous motor and reduction gear assembly 16 is suitably mounted on the rear mounting plate 13, which includes a power shaft 17 that will be hereinafter referred to as an input shaft to the varible speed gearing arrangement of the variable time cycle device. The synchronous motor and reduction gear assembly 16 drives the input shaft 17 at a constant speed or revolutions per minute. A supporting plate 18 extends between and is supported by the front and back mounting plates, and has extending outwardly therefrom, as seen in FIG. 2, a supporting arm 19 that rotatably supports the outer free end of the input shaft 17.

The variable time cycle device of the present invention is essentially a gear arrangement between the input shaft 17 and the output shaft 11, and includes an idler shaft 20 that is rotatably supported at one end by the rear mounting plate 13 and at the other end by the supporting arm 19. The idler shaft 20 is arranged between the input and output shafts and parallel thereto so that all of the shafts extend in parallel relationship to each other. A first input gear 21 and a second input gear 22 of the variable speed gear arrangement are rotatably mounted on an enlarged portion 20a of the idler shaft 20. These input gears are also slidable along the shaft 20. An output gear 23 is mounted on a diametrically reduced portion 20b of the idler shaft 20 at one end of the shaft and adjacent to the first input gear 21. The input gears 21 and 22 are of different sizes and are in meshing engagement with drive gears 24 and 25, respectively, fixed to the input shaft 17. Even though the input gears 21 and 22 are slidable on the shaft 20, they are always in meshing engagement with the drive gears 24 and 25. Because of the differential in size of the input gears and the drive gears 24 and 25, it can readily be appreciated that the input gears will be driven at different speeds. The output gear 23 is in meshing engagement with a driven gear 26 fixed on the output shaft 11 so that the speed of the output shaft 11 depends upon the speed of the idler shaft 20.

A first clutch 27 is provided between the first input gear 21 and the output gear 23, and includes a clutch element 27a formed on the input gear 21 and a clutch element 27b formed on the output gear 23. While the clutch elements are shown to be integral with the gears, it should be appreciated that they could be otherwise formed and suitably coupled to the gears. The clutch elements are formed to mate with each other to lock the input gear 21 to the output gear 23 when in meshing engagement, wherein the clutch element 27a is in the form of a splined conical member while the clutch element 27b is in the form of a socket for receiving the element 27a.

A second clutch 28 is provided between the second input gear 22 and the shaft 20, and includes a clutch element 28a that is fixed to a diametrically reduced portion 20c of the idler shaft 20, and a clutch element 28b integrally formed on the input gear 22. The clutch 28 is in a similar form as the clutch 27, and includes a conically formed, splined member in the element 28a coacting in mating relation with a socketed portion of the element 28b.

As seen in FIG. 3, the clutch 27 is disengaged while the clutch 28 is in engagement, thereby transmitting power from the input shaft 17 through the drive gear 25, the second input gear 22, the clutch 28, the idler shaft 20, the output gear 23, the driven gear 26 and the output shaft 11. The parts in FIG. 4 illustrate the clutch 27 engaged while the clutch 28 is disengaged, whereby the power is transmitted from the input shaft 17 through the drive gear 24, the first input gear 21, the clutch 27, the output gear 23, the driven gear 26 and the output shaft 11.

The means for actuating the clutches is such that it will cause engagement of only one clutch at a time and simultaneously disengagement of the other clutch, and includes an actuating arm 29 pivotally mounted on a pin 30 carried by a supporting arm 31 extending inwardly from the rear mounting plate 13. One end of the actuating arm 29 is provided with a bifurcated portion 32 having upper and lower channel sections 33 and 34 which freely engage flanges 35 and 36 formed on sleeve portions 37 and 38, respectively, of the input gears 21 and 22, respectively. Thus, oscillating movement of the arm 29 causes simultaneous slidable movement of the input gears 21 and 22 along the idler shaft 20 to cause engagement and disengagement of the clutches.

In order to cause movement of the actuating arm 29, and further locking of the arm in one position or the other position to effect one or the other of the time cycles, a pair of shafts 39 and 40 are slidably mounted on the front and rear mounting plates 12 and 13, as seen especially in FIG. 2. The outer free ends of the shafts which are ahead of the front mounting plate 12 are provided with suitable buttons 41 and 42 that are adapted to be engaged for depression of one or the other by the operator to change the time cycle.

The lower shaft 40 includes a pair of collars 43 and 44 fixed thereto in spaced relation to freely receive therebetween a bifurcated end 45 of the actuating arm 29 that extends on the side of the pivot pin 30 opposite from the bifurcated end 32. Thus, movement of the shaft 40 causes movement of the actuating arm 29. A spring 46 is provided on the shaft 40 bottoming at one end against the rear mounting plate and at the other end against the collar 34 to normally urge the shaft 40 in an outward direction or toward the left as seen in FIG. 2. A washer 47 is provided on the shaft 40 to limit its outward movement and prevent it from being pulled from the supporting relationship of the mounting plates. The shaft 40, as shown in dotted lines in FIG. 2, is in the position exerted by the spring 46 when no other restraining force is applied to the shaft and which causes the actuating arm 29 to move the input gears to the position shown in FIG. 3.

A pawl or latch 48 is pivotally mounted at 49 on an arm 50 extending from the rear mounting plate 13, and provided at its upper end with an extension 51 having a laterally extending bifurcated end 52 freely received over the upper shaft 39. A spring 53 is bottomed at one end against the rear mounting plate 13 and at the other end against the bifurcated portion 52 in order to continually urge a biasing force on the latch or pawl 48 to cause it to move in a counterclockwise direction about the pivot 49 as seen in FIG. 2. An E ring 54 is secured to the shaft 39 to abut against and force the latch or pawl 48 inwardly toward the rear mounting plate 13 while depressing the shaft 39. A lug or pawl portion 55 is provided on the latch or pawl 48 to coact with the collar 43 on the shaft 40 to lock the shaft 40 at its inwardly depressed position and cause the actuating arm 29 to move the input gears along the idler shaft 20 to the position shown in FIG. 4 where the clutch 27 is engaged while the clutch 28 is disengaged. A washer 56 is also mounted on the shaft 39 to limit the outward movement of the shaft and prevent it from moving out of the support of the rear mounting plate 13. Thus, changing the time cycle is merely effected by depressing one or the other of the buttons or knobs 41 and 42 which, in turn, cause depression of one or the other of the shafts 39 and 40 to lock the actuating arm in the position shown by the parts in solid line in FIG. 2 or permit the actuating arm to take the position as determined by the spring 46 in driving the shaft 50 to its outward position.

It will be understood that modifications and variations may be effected without departing from the scope of the novel concepts of the present invention, but it is understood that this application is to be limited only by the scope of the appended claims.

The invention is hereby claimed as follows:

1. In a timer device having a power input shaft, a power output shaft and means for driving the power input shaft at a constant speed, the improvement in a variable speed gear means between the shafts for selectively driving said output shaft at a first or second speed, said gear means including a rotatably mounted idler shaft having first and second input gears idly supported thereon and an output gear fixed thereto, a gear on said output shaft meshing with said output gear, first and second gears on said input shaft respectively meshing with said first and second input gears on said idler shaft, a first clutch between said first input gear and said output gear, a second clutch between said second input gear and said idler shaft, actuating means for selectively causing simultaneous engagement of one clutch and disengagement of the other clutch, said first clutch including a clutch element integral with said first input gear and a clutch element integral with said output gear, and said first input gear being slidable on said idler shaft toward and away from said output gear.

2. In a timer device as defined by claim 1, wherein said second clutch includes a clutch element integral with said second input gear and a clutch element fixed to said shaft, and said second input gear being slidable toward and away from said clutch element fixed to the shaft.

3. In a timer device as defined in claim 2, wherein said actuating means is drivingly connected to both said input gears to slide them together along said idler shaft.

4. In a timer device as defined in claim 3, wherein said actuating means includes means to lock same in first or second positions to alternately cause engagement of one clutch and disengagement of the other clutch.

5. In a timer device as defined in claim 4, wherein said lock means includes a pair of slidably mounted shafts, spring means for normally biasing said shafts in one direction, a pawl pivotally mounted and movable with one of the shafts, a detent on the other shaft coacting with the pawl to selectively lock same in one position or permit it to attain a position by the spring means associated therewith.

6. In a timer device as defined in claim 1, wherein the input gears on said idler shaft and said gears on said input shaft are sized so that the output shaft will be driven at one speed when said first clutch is engaged and at another speed when said second clutch is engaged.

References Cited

UNITED STATES PATENTS

| | | | |
|---|---|---|---|
| 2,942,490 | 6/1960 | Riley et al. | 74—370 |
| 3,178,955 | 4/1965 | Enders et al. | 74—369 |

ROBERT M. WALKER, *Primary Examiner.*

DONLEY J. STOCKING, *Examiner.*

H. S. LAYTON, *Assistant Examiner.*